United States Patent
Hobson, Jr.

[15] 3,642,141
[45] Feb. 15, 1972

[54] FILTER TUBE AND CONNECTION THEREOF TO TUBE SHEET

[72] Inventor: Russell B. Hobson, Jr., Montclair, N.J.
[73] Assignee: Per Corporation, West Orange, N.J.
[22] Filed: July 21, 1970
[21] Appl. No.: 56,838

[52] U.S. Cl..............................210/323, 210/457, 210/497
[51] Int. Cl.......................................................B01d 29/14
[58] Field of Search...................210/323, 332, 333, 457, 497

[56] References Cited

UNITED STATES PATENTS

| 385,333 | 6/1888 | Way | 210/323 |
| 2,872,044 | 2/1959 | Kasten | 210/323 |

Primary Examiner—Frank A. Spear, Jr.
Attorney—Harry B. Rook

[57] ABSTRACT

A filter element for filters of the pressure-type includes a socklike pervious filter tube fitted over a tubular open frame which has a flange around which portions of the tube wall are folded. Portions of the frame are resilient and have exterior projections and said frame and filter tube extend through a hole in a tube sheet disposed between the inlet and the outlet of a casing with said flange and said projections abutting opposite sides of said sheet respectively. A flanged hollow plug is frictionally fitted in the frame and engages said resilient portions to hold said projections in abutment with said tube sheet and to clamp said folded portions of the filter tube on said flange.

10 Claims, 16 Drawing Figures

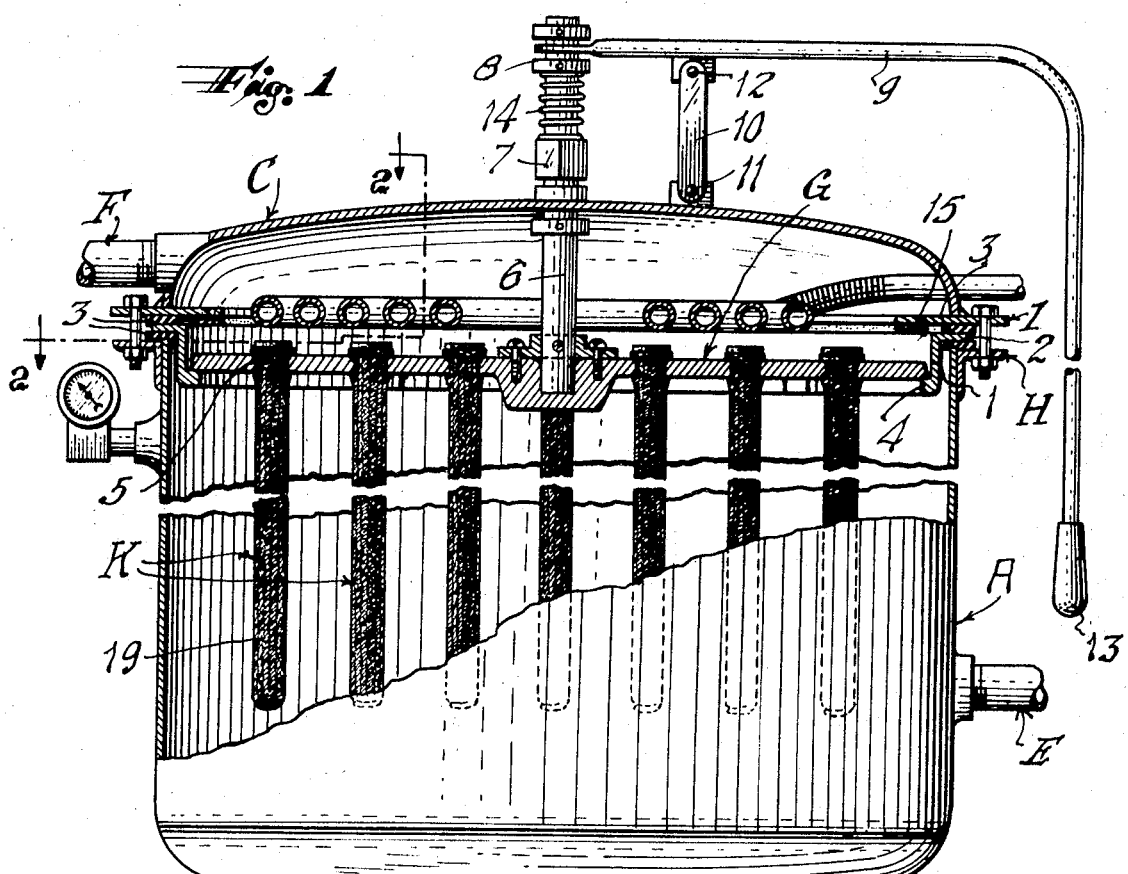
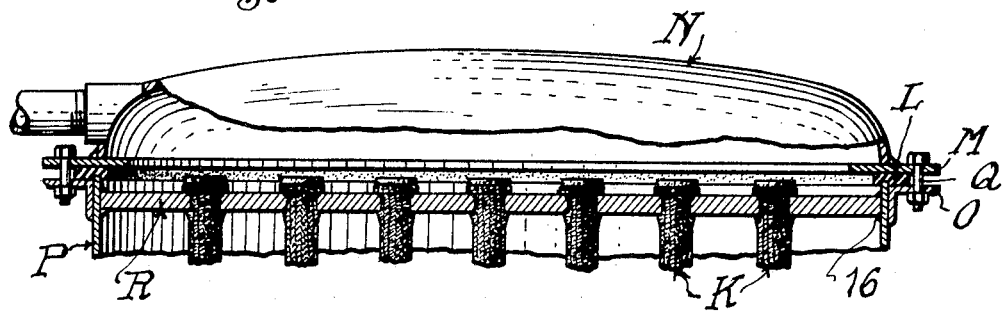
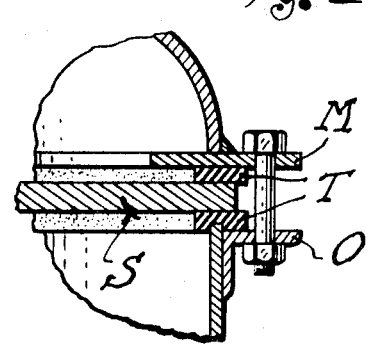
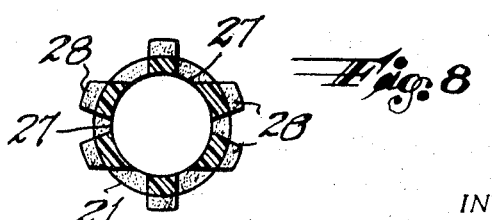
INVENTOR.
Russell B. Hobson, Jr.
BY
*Harry B. Hook*,
ATTORNEY

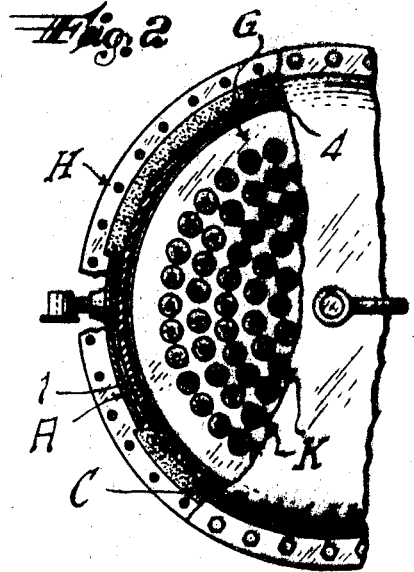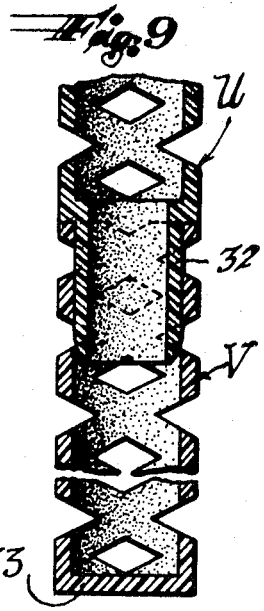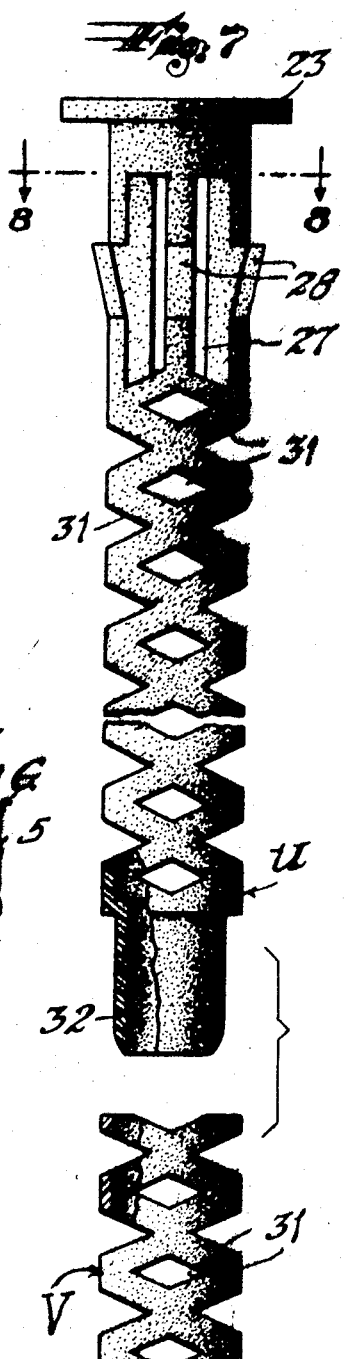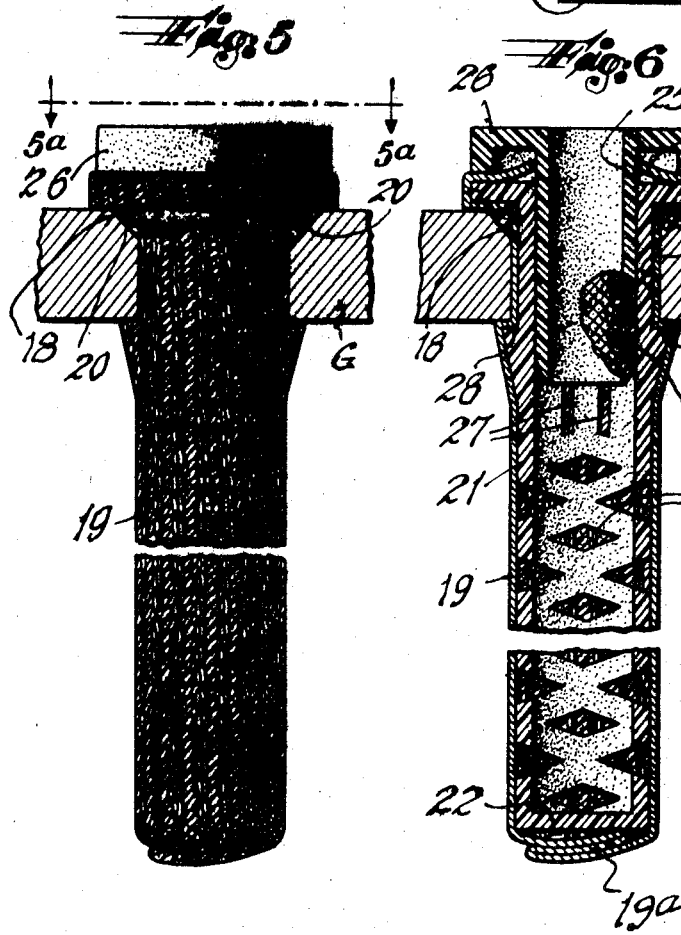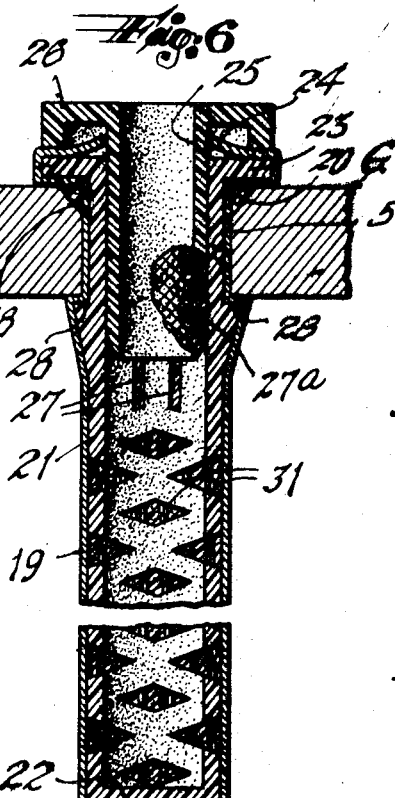

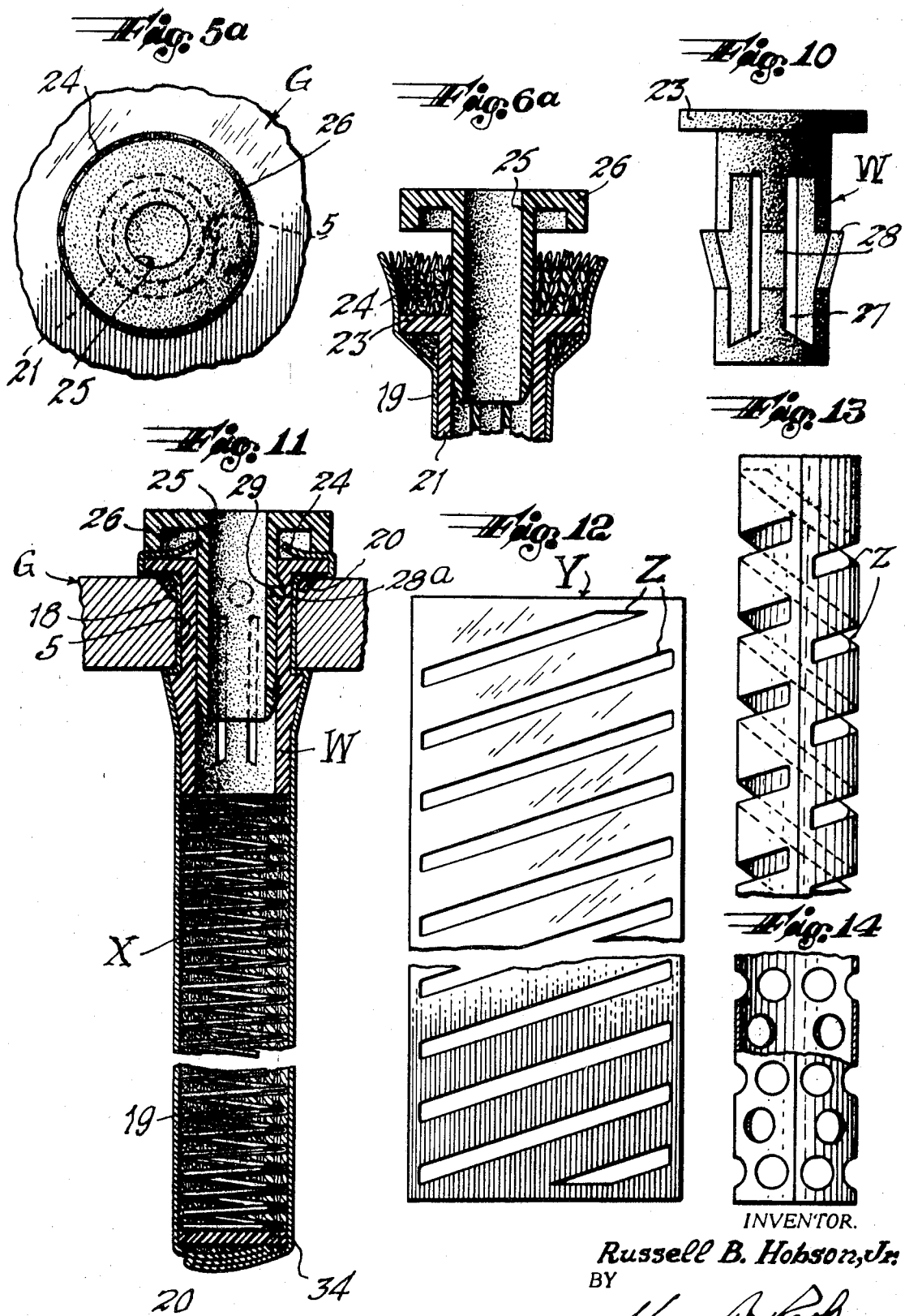

FILTER TUBE AND CONNECTION THEREOF TO TUBE SHEET

BACKGROUND OF THE INVENTION

1. Field of the Invention

This invention relates to a filter wherein a tank or a casing is divided by a tube sheet into lower and upper chambers that have respectively an inlet for fluid to be filtered and an outlet for the filtered fluid, and filter units each comprising a flexible pervious tube and an open or tubular perforated frame therein to prevent collapse of the tube, said tube and frame extending through an opening in said tube sheet and depending from the tube sheet.

2. Description of the Prior Art

In the majority of known constructions the pervious tube formed of metal wire, or the frame has a flange at one end abutting the top side of said tube sheet and a holddown plate is fastened to said tube sheet in overlying relation to said flanges to prevent displacement of the tubes; for example, see U.S. Pat. Nos. 3,100,190 and 2,862,622. This is an expensive construction and requires the removal of several fasteners and the holddown plate to permit inspection and replacement of the tubes.

In the construction shown in U.S. Pat. No. 2,654,482 the flexible pervious tubes comprising braided or woven long synthetic fibers such as glass and Teflon, do not have frames within them, nor is there any holddown plate for the tubes, but the upper end edge of each tube is flared outwardly and pressed against the tube sheet by a flanged ferrule inserted into the tube. However, this construction is objectionable in that the tube and the ferrules can be displaced out of the holes in the tube sheet by the pressure of the incoming liquid so as to interfere with or prevent operation of the filter.

SUMMARY

One object of the invention is to provide a novel and improved construction and combination of a tube sheet, a filter element comprising a filter tube having flexible porous walls, an open support frame for said tube, and means for simply and quickly connecting said filter element to said tube sheet, so as to provide against accidental displacement of the filter element without the necessity for a holddown plate and at the same time to permit easy access to and inspection and removal or replacement of the filter elements individually.

The invention also contemplates a socklike filter tube formed of braided or woven long fibers, for example, glass or Teflon fitted over a tubular open frame which has a portion formed with a flange around which portions of the filter tube are folded and also has wall portions formed with exterior projections in spaced relation to said flange so that the assembled tube and frame can be slipped through a hole in a tube sheet with said flange and said projections at opposite sides of the tube sheet, a flanged hollow plug being frictionally fitted in said tubular frame and clamping said folded portions of the filter tube between said flange and the tube sheet.

The invention also provides means to cause said projections and said flange to grip said tube sheet between them, and preferably to provide such means, said wall portions are resilient and said hollow plug engages said resilient portions to press said projections into engagement with the tube sheet to firmly hold the frame and tube against displacement from said hole in the tube sheet.

In accordance with the invention, the open frame may be formed of one piece of material such as a molded plastic piece, or it may comprise a plurality of separate parts one of which has the resilient wall portions bearing the projections and in combination with said hollow plug constitutes a coupling means for connecting the filter element to the tube sheet.

BRIEF DESCRIPTION OF THE DRAWINGS

FIG. 1 is a composite side elevational and central vertical sectional view of a pressure filter having one type of tube sheet and filter elements embodying the invention;

FIG. 2 is a fragmentary view partially in top plan and partially in horizontal section on the plane of the line 2—2 of FIG. 1;

FIG. 3 is a fragmentary central vertical sectional view through a portion of a pressure filter showing another manner of mounting the tube sheet in the casing;

FIG. 4 is a fragmentary sectional view showing another manner of mounting the tube sheet in the filter casing;

FIG. 5 is a side elevational view of one of the filter elements mounted in a tube sheet a portion of which is shown in vertical section;

FIG. 5a is a top plan view from the plane of the line 5a—5a of FIG. 5;

FIG. 6 is a central vertical sectional view through the filter element as shown in FIG. 5;

FIG. 6a is a fragmentary sectional view of the filter tube, the flanged portion of the tubular frame and the hollow plug, illustrating the parts in partially assembled relation;

FIG. 7 is a composite side elevational view of two sections of a plural section tubular open frame, illustrating the sections in separated relation to each other and with portions broken away and shown in section;

FIG. 8 is a horizontal sectional view on the plane of the line 8—8 of FIG. 7;

FIG. 9 is a fragmentary sectional view of the assembled frame sections shown in FIG. 7;

FIG. 10 is a side elevational view of the tube attaching or coupling part of a multipart frame embodying the invention;

FIG. 11 is a view similar to FIG. 6 showing one form of a multipart support frame in a filter element mounted in a tube sheet;

FIG. 12 is a plan view of a blank for a part of another form of multipart frame;

FIG. 13 is a side elevational view of the frame part formed of the blank shown in FIG. 12, and FIG. 14 is a fragmentary composite side elevational and central longitudinal sectional view of another frame part.

DESCRIPTION OF THE PREFERRED EMBODIMENTS

One form of filter embodying the invention is in general similar to that shown in my U.S. Pat. No. 3,100,190. The filter comprises a tank or container which includes a cylindrical sidewall A, a bottom wall B at one end of the sidewall and a removable dome-shaped cover C at the other end of the sidewall and coaxial therewith. The sidewall A and bottom wall B form the body portion of the tank that has a drainpipe D in its bottom and an inlet pipe E for the liquid to be filtered connected to the sidewall near the bottom of the tank. An outlet pipe F for the filtered liquid is connected to the cover C.

Means is provided for separably connecting the cover C to the body portion of the tank and for supporting a tube sheet G in the tank between the inlet E and the outlet F. As shown, an angular flange H is rigidly and firmly secured to the exterior of the sidewall A closely adjacent to the edge thereof and the cover has a flange I in the form of a ring welded to the cover. A short tube 1 has an exterior circumferential flange 2 clamped between opposite sides of which and the corresponding flanges H and I are packing rings 3. The tube also has an inwardly projecting circumferential flange 4 on which separably rest the edge portions of the tube sheet G which has a plurality of openings 5 therethrough in each of which is fitted a filter unit K which comprises a pervious filter tube fitted over an open frame as hereinafter described. The flange is notched for passage of liquid.

In this form of the filter the tube sheet and the filter units are movable up and down or in a direction longitudinal of the tubes, and for this purpose the tube sheet has connected thereto a slide rod 6 which is slidably mounted in a bearing 7 in the cover and has connected thereto a groove collar 8 with which coacts the forked end of an actuating lever 9 which is pivotally mounted on the cover by a link 10 whose ends are pivotally connected to the cover and to the actuating lever as indicated at 11 and 12, respectively. The lever has a handgrip 13 and with this construction it will be observed that by swinging the lever about its pivotal connections the tube sheet may be moved up and down in the tank.

Preferably a compression spring 14 is interposed between the collar 8 and the bearing 7 so as to normally approximately balance the weight of the filter tubes and the tube sheet assembly so that upon influx of liquid under pressure into the tank during the filtering operation the assembly can be easily forced upwardly until the gasket ring 15 on the under side of the inner edge portion of the flange I is engaged by the top of the tube sheet to insure flow of liquid through the outlet F only by way of the filter units.

In FIG. 3 is illustrated another form of the filter wherein gasket L is clamped by bolts Q between the flange M of the cover N and the flange O on the body portion P of the filter tank. The tube sheet R is rigidly mounted as by welds 16 in the body portion of the tank, between the inlet and outlet of the tank in the same manner as shown in FIG. 1, and the filter units K are fitted in openings in the tube sheet in the same manner shown in FIG. 1.

FIG. 4 shows another manner of mounting the tube sheet S in the filter tank. Here gaskets T are interposed between the tube sheet and the flanges M and O so as to provide a liquid-tight connection between the tube sheet and the filter casing. The tube sheet supports filter elements in exactly the same manner that the filter elements are supported in the tube sheet G.

More specifically describing the invention, the tube sheet G constitutes a circular plate of suitable material, preferably a hard synthetic plastic material and preferably but not necessarily the openings 5 are arranged in concentric circular rows and each opening preferably has a beveled surface 18 at the upper side of the tube sheet both to facilitate the insertion of the filter units through the openings and to provide seats for elastic O-rings 20 that normally project above the plane of the top surface of the tube sheet.

Each filter unit is shown as comprising a pervious filter tube 19 braided or woven of long flexible fibers of suitable material such as "Dacron," glass, polyethylene (Teflon). Preferably the fibers are braided in a manner similar to the filter tubes described in my U.S. Pat. No. 3,100,190 so that the walls of the tube may expand and contract both longitudinally and perimetrally in response to variations in pressure differential in the liquid on opposite sides of said wall. The tube is closed at its lower end as indicated at 19a and initially its upper end is open as indicated in FIG. 6a. The material of which the tube is formed may be either yarnlike or monofilament.

The flexible tube is supported by a relatively rigid open support frame 21 preferably formed of a synthetic plastic material such as polyethylene or "Delrin." The frame is preferably closed at its lower end as indicated at 22 and has at its other end an outwardly extending annular flange 23.

The support frame 21 has limited inherent resiliency and a portion thereof inwardly of the flange 23 has longitudinal slots 27 spaced apart circumferentially of the frame. The resilient portions between the slots have projections or locking lugs 28 projecting outwardly. The projections or lugs 28 are spaced from the flange 23 a distance slightly greater than the thickness of the tube sheet and the diameter of the frame is slightly less than the diameter of the corresponding opening 5 in the tube sheet.

The filter tube 19 is loosely slid over the frame from the lower end of the frame and the end portions 24 of the tube at the open end thereof are folded from the position shown in FIG. 6a around and inwardly over the flange 23 of the frame as shown in FIG. 6.

In mounting the filter units in the tube sheet, the assembled support frame and filter tube are slid through the tube sheet opening 5 until the lugs 28 pass the lower side of the tube sheet, the O-ring 20 being slightly compressed during this operation. As the assembly is slid through the opening, the lugs are pressed inwardly and when they pass the bottom surface of the tube sheet they spring outwardly so that the tube sheet is gripped between the lugs and the flange 23 as best shown in FIG. 6.

A hollow plug 25 is then frictionally slid into the support frame and has a flange 26 which grips between itself and the flange 23, the in-folded portions 24 of the filter tube. At the same time, the plug presses outwardly on the walls of the frame so as to hold the lugs 28 against such movement inwardly of the frame as might permit displacement of the filter unit from the tube sheet opening. Any of various means may be utilized, if desired, for preventing accidental displacement of the hollow plug from the tube frame. For example, the outer surface of the plug may be roughened or knurled as indicated at 27a in FIG. 6 or pimplelike projections 28a may be provided on the outer surface of the plug to resiliently snap into and yieldingly move out of correspondingly shaped recesses 29 on the inner surface of the support frame, as the plug is moved into and out of the support frame, respectively.

This construction provides for easy and quick assembly of the filter units and the tube sheet, and eliminates the necessity for a holddown plate for holding the tubes against displacement from the tube sheet.

The support frame shown in FIG. 6 has a plurality of diamond-shaped holes 31 extending through its walls in spaced apart relation longitudinally and circumferentially thereof, thereby providing a simulation of two helices running in opposite directions and joined together at the points of intersection of their convolutions. The frame has some resiliency longitudinally and is yieldingly resilient to twisting about its own axis.

If desired, the support frame may be formed in a plurality of sections as shown in FIGS. 7 and 9. The main section U has a nipplelike end 32 which frictionally fits into one end of another section V, FIG. 7 showing the two sections separated and FIG. 9 showing them connected together. The bottom section has its lower end closed as indicated at 33.

The invention also contemplates a multipart support frame one of which is shown in FIG. 11. Here the main part W which serves as the attaching part for mounting the filter element on the tube sheet and in effect is identical with the upper portion of the support frame shown in FIG. 6. The other part X is shown as comprising a helical wire coil disposed between the lower end of the attaching section W and a disk 34 in the lower and closed end of the filter tube 19.

Instead of using a coiled wire, the section may comprise a flat sheet of metal or plastic material designated Y in FIG. 12, having slots Z and rolled into cylindrical form as shown in FIG. 13.

Instead of forming slots in the sheet of material, a plurality of circular holes may be provided as shown in FIG. 14, and it will be clear to those skilled in the art that other types of open frames may be employed.

What is claimed is:

1. A filter comprising a casing, a tube sheet dividing said casing into a lower chamber and an upper chamber which have respectively an inlet and an outlet, said tube sheet having openings therethrough and a filter unit in each opening, each filter unit including a filter tube having a pervious flexible sidewall, a closed bottom and an open top, and an open support frame inside and in loosely sliding contact with the walls of said tube and having an annular flange over and around which is folded and secured the wall portion of said filter tube at the open end thereof, said frame having exterior projections in spaced relation to said flange and overlaid by said filter tube, and means causing said projections and said flange to grip said tube sheet between them and thereby hold said filter element against displacement from said opening in the tube sheet.

2. A filter as defined in claim 1 wherein the last-named means includes the assembly of said support frame and filter tube frictionally slidably mounted in said opening in the tube sheet, and said projections movable inwardly and outwardly as the assembly is slid through said opening from the top side of the tube sheet and as the projections pass out of the opening at the bottom side of said sheet respectively, and a hollow plug frictionally fitted in said support frame and having a flange clamping between itself and said flange of the support frame said wall portion of the filter tube that is folded over and around said flange of the support frame.

3. A filter as defined in claim 2 wherein said support frame has portions of its wall resilient and bearing said projections so that the projections are normally biased outwardly of the frame, and said hollow plug engages said resilient portions to hold said projections against movement inwardly of the frame.

4. A filter as defined in claim 3 wherein said support frame wall possesses limited inherent resiliency and has longitudinal slots spaced apart perimetrally of the frame providing resilient portions between them, and said projections constitute lugs on said resilient portions.

5. A filter as defined in claim 4 wherein said support frame is formed of synthetic plastic material and has a plurality of openings extending through the wall thereof in spaced apart relation longitudinally and circumferentially thereof, said openings being diamond-shaped and providing a simulation of two helices running in opposite directions and joined at their points of intersection.

6. A filter unit for use with the tube sheet of a filter, said filter unit comprising a filter tube having a pervious flexible sidewall and bottom and an open top, and an open support frame inside and in loosely sliding contact with the walls of said tube and having an annular flange over and around which is folded and secured the wall portion of said filter tube at the open end thereof, portions of the wall of said frame being resilient and bearing exterior projections in spaced relation to said flange and overlaid by said filter tube, said projections normally being biased outwardly, and a hollow plug frictionally fitted at said support frame and having a flange clamping between itself and said flange of the support frame said wall portion of the filter that is folded over and around said flange of the support frame, said plug engaging said resilient wall portions to hold said projections against movement inwardly of the frame.

7. A filter unit as defined in claim 6, said support frame comprising a plurality of separable parts one of which has said resilient wall portions, said annular flange and said projections and constituting coupling means for connecting the filter element to the tube sheet.

8. A filter unit as defined in claim 6 wherein said support frame is formed of synthetic plastic material possessing limited inherent resiliency and has longitudinal slots spaced apart perimetrally of the frame providing resilient portions between them, and said projections constitute lugs on said resilient portions.

9. A filter unit as defined in claim 8 wherein said support frame is cylindrically tubular and has a plurality of diamond-shaped openings extending through the wall thereof in spaced apart relation longitudinally and circumferentially of said wall, providing a simulation of two helices running in opposite directions and with their convolutions joined at their points of intersection.

10. A filter as defined in claim 1 wherein a resilient ring encircles the filter unit and is compressed between the flange of the support frame and the tube sheet.

* * * * *